United States Patent
Blakesley et al.

(10) Patent No.: US 6,231,076 B1
(45) Date of Patent: May 15, 2001

(54) AUTOMOBILE SEAT HAVING SEAT SUPPORTING BRACKETS WITH A STEPPED WEIGHT SENSOR

(75) Inventors: Patrick B. Blakesley, Elkhart; William Osmer, St. Joseph, both of IN (US); Michael R. Wills, Macomb, MI (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/441,350

(22) Filed: Nov. 16, 1999

(51) Int. Cl.$^7$ ................................................. B60R 21/32
(52) U.S. Cl. ............................ 280/735; 180/271; 180/273
(58) Field of Search ........................................ 280/735, 732; 180/271, 273; 296/68.1

(56) References Cited

U.S. PATENT DOCUMENTS

| | | |
|---|---|---|
| 4,556,598 | 12/1985 | Bloom . |
| 5,232,243 * | 8/1993 | Blackburn et al. .................. 280/732 |
| 5,573,269 | 11/1996 | Gentry . |
| 5,959,214 * | 9/1999 | Vaidyanthan et al. ................. 73/777 |
| 5,971,432 * | 10/1999 | Gagnon et al. ....................... 280/735 |
| 6,039,344 * | 3/2000 | Mehney et al. ...................... 280/735 |
| 6,069,325 * | 5/2000 | Aoki ..................................... 177/136 |
| 6,070,115 * | 5/2000 | Oestreicher et al. .................. 701/45 |
| 6,092,838 * | 7/2000 | Walker ................................ 280/735 |

FOREIGN PATENT DOCUMENTS 3-214217 * 9/1991 (JP) .

\* cited by examiner

*Primary Examiner*—Paul N. Dickson
(74) *Attorney, Agent, or Firm*—Mark P. Bourgeois; Mark W. Borgman

(57) ABSTRACT

A vehicle seat weight sensor for sensing the weight of an occupant in a vehicle seat. The sensor has a substrate that is attached between the ends of a seat bracket such that a portion of the forces applied to the seat are transferred from a seat pan to an upper slide rail through the substrate. Strain gage resistors are located on the substrate to generate an electrical signal in response to the substrate being stressed. The electrical signal changes magnitude as a function of the weight of the seat occupant. The substrate has a pair of step sections for concentrating the forces onto the strain gage resistor.

7 Claims, 4 Drawing Sheets

AUTOMOBILE SEAT HAVING SEAT SUPPORTING BRACKETS WITH A STEPPED WEIGHT SENSOR

CROSS REFERENCE TO RELATED AND CO-PENDING APPLICATIONS

This application is related to the following U.S. patent applications:

U.S. patent application Ser. No. 09/374,874, filed Aug. 16, 1999 and titled, "Automobile Seat Weight Sensor".

U.S. patent application Ser. No. 09/374,870, filed Aug. 16, 1999 and titled, "Vehicle Occupant Position Detector and Airbag Control System".

U.S. patent application Ser. No. 09/422,382, filed Oct. 21, 1999 and titled, "Vehicle Seat Weight Sensor".

The foregoing patents have the same assignee as the instant application and are herein incorporated by reference in their entirety for related and supportive teachings.

BACKGROUND OF THE INVENTION

1. Field of the Invention

This invention relates to an automobile weight sensor for detecting the presence of a person having a weight in a car seat, and in particular to a sensor that can detect the presence of an occupant using strain sensitive resistors and provide an electrical signal to control activation of an airbag.

2. Description of the Related Art

Various devices are well known for their ability to measure force, pressure, acceleration, temperature, position, etc. by using a sensing structure combined with signal processing electronics. One general type of sensor or transducer for such applications is a resistive strain gauge sensor in which force or pressure is sensed or measured based on strain placed on the resistors. Resistive strain gauges function by exhibiting changes in resistance proportional to force which causes dimensional changes of the resistor.

Many types of strain gauge sensors have been designed and made commercially available. Various strain gauge sensors have proven to be generally satisfactory. Prior art sensors, however, have tended to be rather expensive and not suitable in certain applications such as sensing the presence of an occupant in an automobile seat. A sensor suitable for such an application must be compact, robust, impervious to shock and vibration and yet inexpensive.

Automobile seats can use sensors to activate air bags, which would be deployed during an accident. Injury to infants or small children from air bag deployment with excessive force is a current industry problem. A weight sensor in the seat can be used to control the deployment force during air bag activation. If a heavy person is in the seat, the airbag is deployed at full force. If a light person is in the seat, such as a child, the airbag is deployed at a slower, less forceful rate or not at all. A current unmet need exists for a reliable, low cost, simple and robust automobile seat weight sensor that is used to control airbag deployment.

3. Related Art

Examples of patents that are related to the present invention are as follows, and each patent is herein incorporated by reference for the supporting teachings:

U.S. Pat. No. 5,573,269 is a apparatus for sensing and restraining an occupant of a vehicle seat.

U.S. Pat. No. 4,556,598 is a porcelain tape for producing porcelainized metal substrates.

The foregoing patents reflect the state of the art of which the applicant is aware and are tendered with the view toward discharging the applicant's acknowledged duty of candor in disclosing information which may be pertinent in the examination of this application. It is respectfully stipulated, however, that none of these patents teach or render obvious, singly or when considered in combination, the applicants claimed invention.

SUMMARY OF THE INVENTION

It is a feature of the invention to provide a reliable and cost-effective vehicle seat weight sensor for detecting the weight of a seat occupant. The sensor uses strain gauge resistors.

An additional feature of the invention is to provide a vehicle seat weight sensor for connecting to an external electrical circuit. The sensor includes a substrate that has a center section and a step section attached to the center section. The center section is located adjacent to the step section. An outer section is attached to the step section. One or more strain gage resistors are mounted on the center section of the substrate to generating an electrical signal in response to the substrate being stressed. A seat bracket has a first and second end. The seat bracket is located between a seat pan and an upper slide rail. The substrate is mounted between the first and second ends of the seat bracket such that a portion of the forces applied to the seat pan are transferred from the seat pan to the upper slide rail through the substrate. The outer sections are attached to the first and the second ends of the bracket.

Another feature of the invention is to provide a vehicle seat weight sensor for sensing the weight of an occupant in a vehicle seat. The seat has a seat back, a seat bottom attached to a seat pan, a seat bracket having a first end attached to the seat pan, an upper slide rail coupled to a second end of the seat bracket and a lower slide rail coupled to the upper slide rail. The sensor includes a substrate that has a first and second outer section. The first outer section is attached to the first end of the seat bracket and the second outer section is attached to the second end of the seat bracket such that a portion of the forces applied to the seat bottom are transferred from the seat pan to the upper slide rail through the substrate. One or more strain gage resistors are located on the substrate to generate an electrical signal in response to the substrate being stressed. The electrical signal changes magnitude as a function of the weight of the seat occupant. The substrate has a center section that has the stain gage resistor mounted on it. A pair of step sections are attached to the center section. The center section is located between the step sections for concentrating the forces onto the strain gage resistor. The first and second outer sections are attached to the step sections. The substrate has a fastener that is connected between the first end of the seat bracket and the first outer section and a second fastener that is connected between the second end of the seat bracket and the second outer section. The electrical signal is used to control activation of an airbag.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
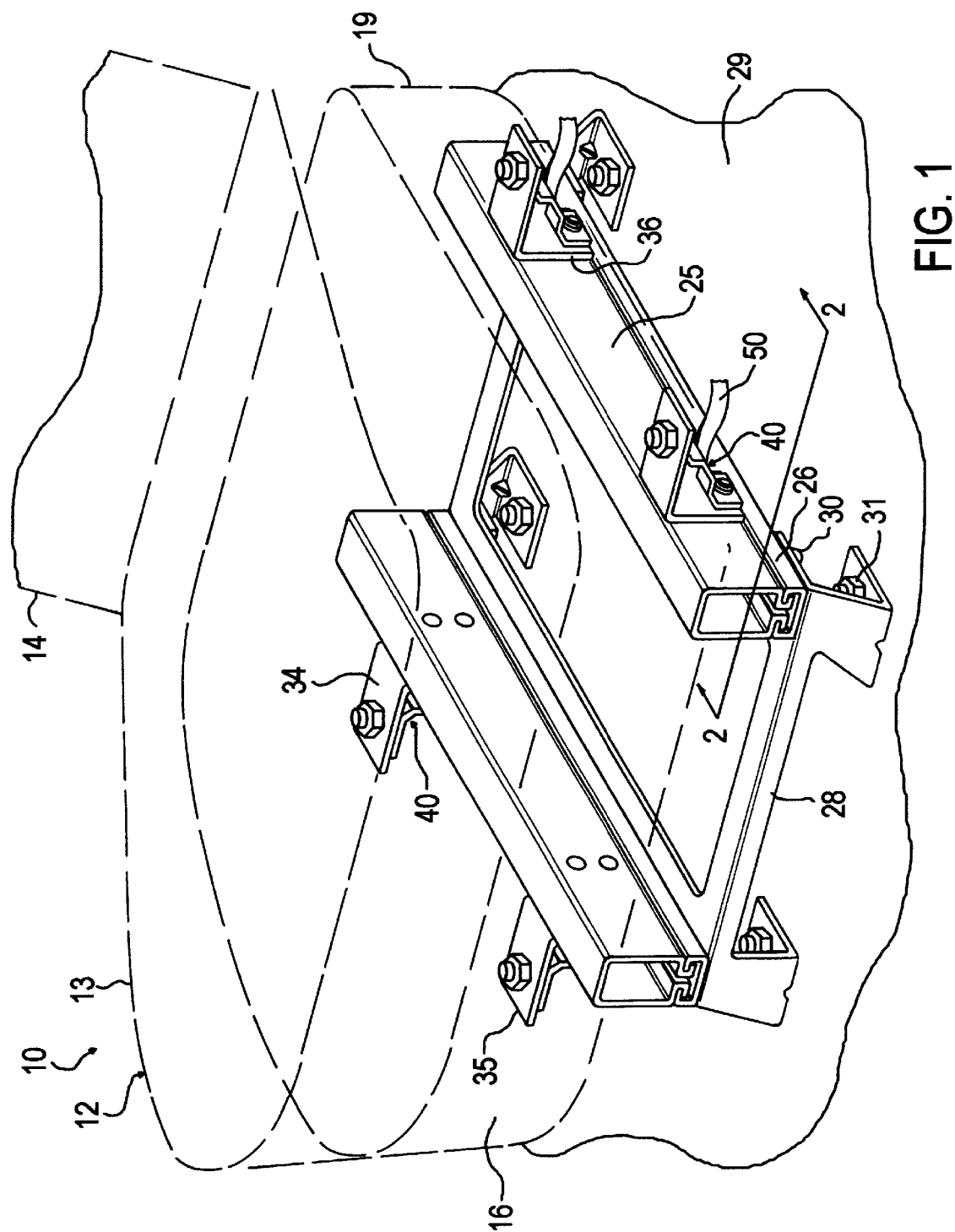
FIG. 1 is a perspective view of the preferred embodiment of an automobile seat weight sensor in an automobile seat.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings like numbering represents like elements between the drawings.

DETAILED DESCRIPTION OF THE PREFERRED EMBODIMENTS

Figure 2:
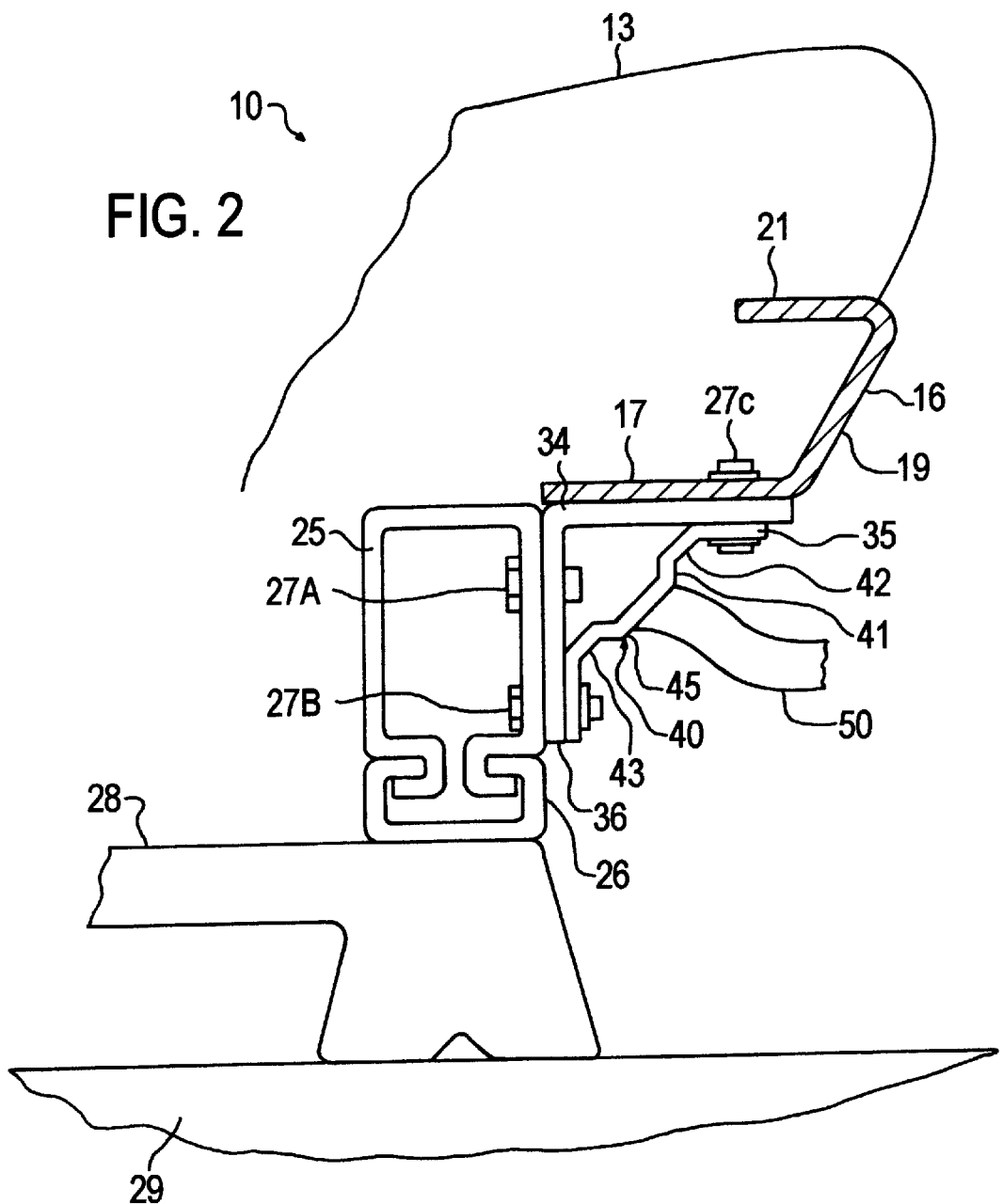
FIG. 2 is a side view of the sensor of FIG. 1 taken along lines 2—2.

The present invention provides a vehicle weight sensor for detecting the weight of a seat occupant. Referring to FIGS. 1 and 2, there is a seat assembly 10 shown. Seat assembly 10 has a seat 12 with a seat back 14, and a seat bottom 13. A seat pan 16 is located between an rectangular tube like upper slide rail 25 and seat bottom 13. Seat pan 16 has seat pan bottom 17. A seat pan outer rim 19 runs around the outside perimeter of seat pan 16. A seat lip 21 extends inwardly from outer rim 19. A channel shaped lower slide rail 26 is slidably attached to upper slide rail 25 by roller bearings (not shown). The slide rails 25 and 26 allow seat assembly 10 to slide forward and backwards in a vehicle. The lower slide rail 26 is attached to seat base 28 by a fastener 30 such as a bolt or rivet. The base 28 is attached to a vehicle floor 29 by a fastener 31 such as a bolt or rivet.

Four generally right angle shaped seat brackets 34 are shown mounted at the four corners of seat assembly 10 between seat pan 16 and upper slide rail 25. Seat bracket 34 has an upper end 35 and a lower end 36. Fasteners 27A and 27B attach lower end 36 to upper slide rail 25. Fastener 27C attaches upper end 35 to seat pan bottom 17. Fasteners 27A, 27B and 27C are conventional fasteners such as hex headed bolts and nuts or tapped Allen head screws or tapped shoulder screws or rivets.

Four weight sensor assemblies 40 are shown mounted to brackets 34. Sensors 40 are attached diagonally between upper end 35 and lower end 36. Since the bracket is generally shaped like a right angle the sensor 40 would be positioned generally along the hypotenuse of a triangle formed by the bracket and the sensor 40. Sensors 40 are attached to upper end 35 and lower end 36 by fasteners 27C and 27B, respectively. Sensor 40 has a metal substrate 41 with two outer sections, a first outer section 42 and a second outer section 43. A cover coating 45 is located in the middle of sensor 40.

When an occupant sits on seat bottom 12, the seat occupants weight is transferred from seat bottom 12, to seat pan 16, partially through bracket 34 and partially through sensor 40, to upper slide rail 25, then to lower slide rail 26, then to seat base 28 and then to floor 29. A portion of the weight of the seat occupant is transferred as a force through the four sensors 40. This weight causes strain in sensor 40 and is measured by sensor 40. An electrical output signal is generated and transmitted over a wire harness 50 to a conventional air bag controller (not shown). The air bag controller then can control deployment of the airbag based upon the seat occupants weight. The wiring harnesses 50 from four sensors 40 can be connected together at a junction box (not shown) in the center of the seat if desired. The junction box would allow for convenient attachment of a single connector to connect with all four sensors 40.

Figure 3:
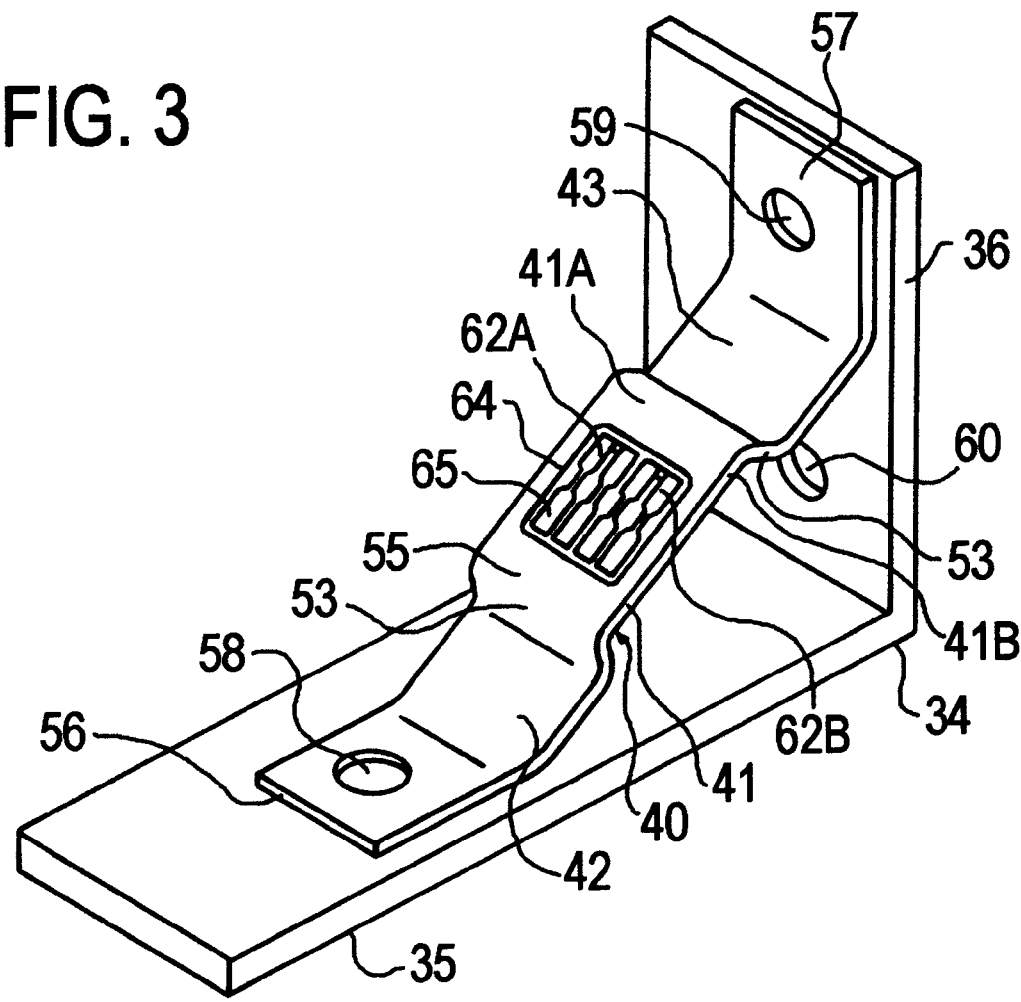
FIG. 3 is an enlarged perspective view of the automobile seat weight sensor and seat bracket.

Referring additionally to FIG. 3, more details of the sensor assembly 40 with the cover coat 45 removed are shown. Sensor assembly 40 has a metal substrate 41 with an upper surface 41A and a bottom surface 41B. Metal substrate 41 is preferably formed from 430 stainless steel. Substrate 41 has step sections 53 that extend away generally perpendicularly on both sides of a center section 55. Outer sections 42 and 43 connect with and extend away from step sections 53. Additionally, a third outer section 56 is connected to first outer section 42 and a fourth outer section 57 is connected to second outer section 43. Aperture 58 extends through outer section 56. Aperture 59 extends through outer section 57. Aperture 60 extends through outer seat bracket lower end 36. Fasteners 27B and 27A pass through apertures 59 and 60, respectively. Fastener 27C passes through aperture 58. Fasteners 27B and 27C hold substrate 41 to bracket 34. Substrate 41 including center section 55, step sections 53, outer sections 42, 43 and 56, 57 and apertures 58, 59, 60 are formed by stamping or bending of metal substrate 41.

Several strain gage resistors 62A and 62B are arranged on surface 41A within center section 55. Resistors 62A and 62B are made up of two smaller rectangles of resistive material that are interconnected. Similarly, resistors 62C and 62D (not shown) are located on the bottom surface 41B. An insulative dielectric layer 64 is shown disposed on top surface 41A. Similarly, layer 64 would be disposed on bottom surface 41B. On top of the dielectric layer 64, the strain gage resistors 62A–D are formed. Resistors 62A–D are strain sensitive and will change resistance based on the amount of strain in substrate 41. Output pads 65 are connected to resistors 62A–D. The output pads 65 are used to solder (not shown) to the individual wires in wiring harness 50. Cover coat 45 is placed over resistors 62A–D and output pads 65. The cover coat protects the resistors from damage and acts as a solder mask. Dielectric layer 64, Resistors 62A–D and output pads 65 can be formed from conventional thick film materials using conventional thick film screening and processing techniques. Dielectric layer 64, Resistors 62A–D and output pads 65 can also be formed from a ceramic green tape. Such methods of forming resistors on metal substrates are detailed in U.S. Pat. No. 4,556,598 titled, "A porcelain tape for producing porcelainized metal substrates", the contents of which are specifically herein incorporated by reference.

In a typical configuration, Resistors 62A and 62C would be connected to form a half bridge circuit (not shown) and resistors 62B and 62D would be connected to form another half of a bridge circuit that is well known in the art. The two half bridges would be connected to form a full bridge circuit.

Figure 4:
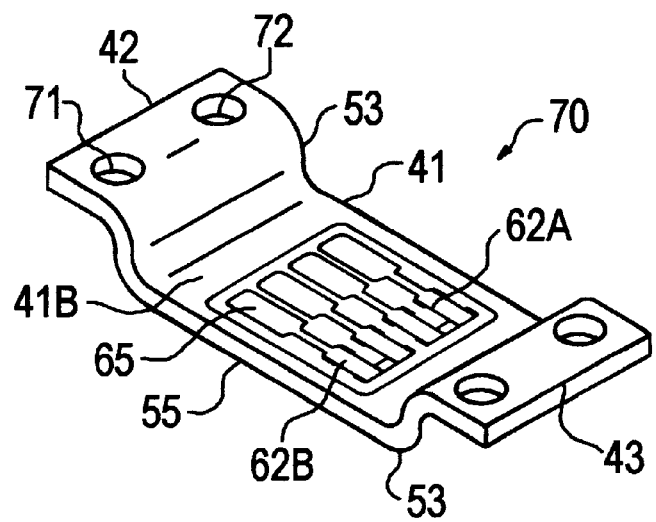
FIG. 4 is a perspective view of an alternative embodiment of a seat weight sensor.
Figure 5:
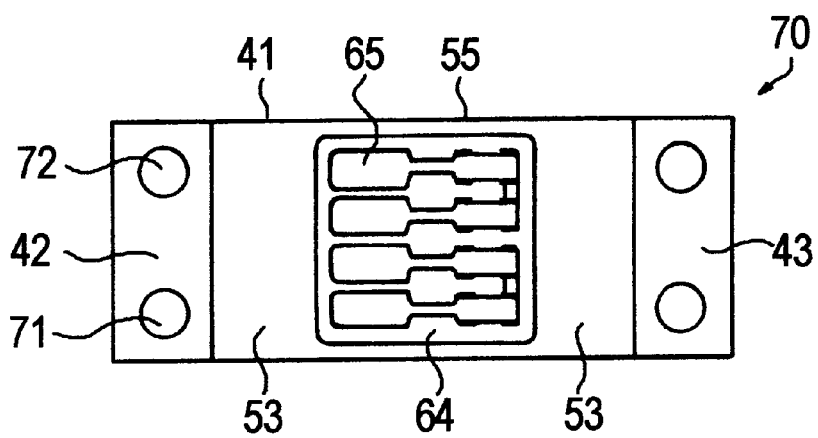
FIG. 5 is a top view of FIG. 4.
Figure 6:
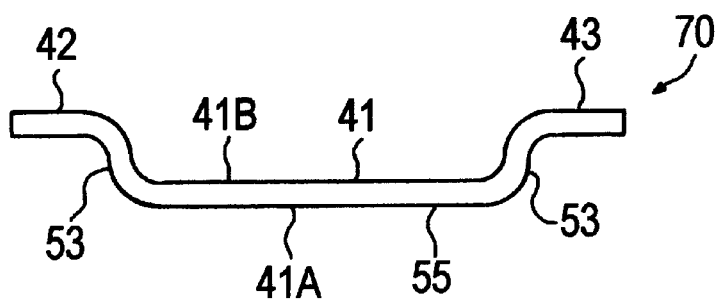
FIG. 6 is a side view of FIG. 4.

Referring to FIGS. 4, 5 and 6 an alternative embodiment of a seat weight sensor 70 is shown. Sensor 70 is designed to be piggyback mounted to a weight carrying member (not shown) in a vehicle seat. Sensor 70 is identical to sensor 40 except that the third and fourth outer sections 56 and 57 have been omitted and a pair of apertures 71 and 72 have been placed in the first and second outers sections 42 and 43. Apertures 71 and 72 would have fasteners (not shown) placed through them in order to attach sensor 70 to a weight carrying member in a car seat. Sensor 70 can be attached by bolts, rivets or welding. A portion of the seat occupants weight is transferred though sensor 70 when it is mounted to a weight carrying member in a car seat. This weight causes strain in sensor 70 and is measured by the strain gage resistors 62A–D. An electrical output signal is generated and transmitted to a conventional air bag controller (not shown). The electrical output signal is proportional to the weight of the seat occupant.

Remarks About the Preferred Embodiment

When an occupant sits in a vehicle seat, a portion of the occupant's weight is transferred to substrate 41 as a force through bracket 34. Step sections 53 cause the center section 55 of substrate 41 to bend. As the center section 55 bends, the resistors 62A, 62B on the upper surface 41A will be in tension and the resistors 62C, 62D on the bottom surface 41 B will be in compression. A voltage is applied to the resistors 62A–D. The strain on resistors 62A–D causes the voltage or electrical output signal across the resistors to change as a function of the weight of the seat occupant. The electrical signal is transmitted over wire harness 50 to a conventional air bag controller. The air bag controller then can control deployment of the airbag based upon the occupant's weight. Typically, the air bag is disengaged or turned off below a minimum weight. The air bag deploys with less force for a lighter person and more force for a heavier person.

Variations of the Preferred Embodiment

Although the illustrated embodiment shows resistors 62A–D on the top and bottom surfaces of substrate 41, more or fewer resistors could be used. If desired, resistors 62A–D could be placed on only one surface of substrate 41.

The weight sensor shown used a thick film resistor, one skilled in the art will realize that the preferred embodiment would work with other types of resistors. For example, discrete chip resistors could be attached to substrate 41 or thin film resistors could be used. Furthermore, the shape of substrate 41 could be varied to any configuration that would transfer a portion of the weight from the seat and concentrate it in the desired location on the substrate.

Although sensor assembly 40 was shown without a housing, it is contemplated to add a housing.

Another variation of the weight sensor would be to utilize other electrical connections other than a wire harness 50. For example, a connector or terminal.

Yet, a further variation, would be to place signal conditioning circuitry on substrate 41 to amplify and filter the electrical signal before it is transmitted to the airbag controller.

The weight sensor shown was mounted to a seat bracket, one skilled in the art will realize that the preferred embodiment could be mounted to other seat members in other locations in the seat. For example, the weight sensor could be placed on the slide rails or on the seat pan or on a part of the base.

The illustrated embodiment showed the use of the weight sensor in an automobile seat. It is contemplated to utilize the weight sensor in other occupant weight sensing applications such as chairs, sofas, scales, beds and mattresses, hospital equipment, cribs, airplane seats, train seats, boat seats, amusement rides, and theater seats.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle seat weight sensor for sensing the weight of an occupant in a vehicle seat, the seat having an upper and a lower slide rail, a seat pan, a seat back and a seat bottom, the sensor comprising:

a) at least one seat bracket having a first and second end, the seat bracket located between the seat pan and the upper slide rail;

a) a substrate attached substantially diagonally between the first and second ends of the bracket such that a portion of force applied to the seat bottom is transferred from the seat pan to the upper slide rail through the substrate;

b) a plurality of strain gauge resistors, located on the substrate, for generating an electrical signal in response to the substrate being stressed, the electrical signal changing as a function of the weight of the seat occupant; and c) a plurality of fasteners, located at the first and second ends of the bracket, for attaching the substrate to the seat bracket.

2. The vehicle seat weight sensor according to claim 1, wherein the substrate has at least one step section for concentrating the forces onto the strain gauge resistors.

3. The vehicle seat weight sensor according to claim 2, wherein the substrate has a center section that is attached to the step section, the center section located adjacent the step section, the resistors being mounted on the center section.

4. The vehicle seat weight sensor according to claim 3, wherein the substrate has at least one outer section attached to the step section.

5. The vehicle seat weight sensor according to claim 4, wherein the bracket forms substantially a right angle.

6. The vehicle seat weight sensor according to claim 5, wherein the substrate is located generally along a hypotenuse of the right angle.

7. The vehicle seat weight sensor according to claim 6, wherein the outer section is attached to the bracket ends by the fasteners.

\* \* \* \* \*